United States Patent
Cho

(10) Patent No.: US 10,919,565 B2
(45) Date of Patent: Feb. 16, 2021

(54) NOISE REDUCTION STRUCTURE OF ELECTRONIC POWER STEERING APPARATUS

(71) Applicants: Hyundai Motor Company, Seoul (KR); KIA Motors Corporation, Seoul (KR)

(72) Inventor: Sung-Shik Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 214 days.

(21) Appl. No.: 16/193,400

(22) Filed: Nov. 16, 2018

(65) Prior Publication Data

US 2020/0116249 A1  Apr. 16, 2020

(30) Foreign Application Priority Data

Oct. 10, 2018 (KR) .......................... 10-2018-0120165

(51) Int. Cl.
- *B62D 5/04* (2006.01)
- *F16H 57/00* (2012.01)
- *F16H 1/16* (2006.01)

(52) U.S. Cl.
CPC .......... *B62D 5/0454* (2013.01); *B62D 5/0409* (2013.01); *F16H 1/16* (2013.01); *F16H 57/0006* (2013.01)

(58) Field of Classification Search
CPC .............................. B62D 5/0454; F16H 7/0006
See application file for complete search history.

(56) References Cited

U.S. PATENT DOCUMENTS

| | | | |
|---|---|---|---|
| 8,443,929 B2 | 5/2013 | Suzuki et al. | |
| 8,505,675 B2 * | 8/2013 | Suzuki | F16D 3/68 180/444 |
| 9,789,903 B2 * | 10/2017 | Moriyama | F16F 15/136 |
| 10,054,190 B2 * | 8/2018 | Kim | F16D 3/12 |
| 10,556,616 B2 * | 2/2020 | Yun | B62D 5/0403 |
| 2016/0121921 A1 | 5/2016 | Schönlechner et al. | |
| 2019/0353238 A1 * | 11/2019 | Kim | F16H 1/16 |
| 2020/0208735 A1 * | 7/2020 | Guerin | F16H 57/12 |

FOREIGN PATENT DOCUMENTS

| | | | |
|---|---|---|---|
| JP | 2007-270943 | 10/2007 | |
| JP | 2008-174024 | 7/2008 | |
| KR | 1011889320000 | 9/2012 | |
| KR | 1015097940000 | 4/2015 | |
| KR | 10-2016-0041486 | 4/2016 | |
| WO | WO-2018220317 A1 * | 12/2018 | ............. F16H 55/24 |

* cited by examiner

*Primary Examiner* — Kevin Hurley
(74) *Attorney, Agent, or Firm* — Brinks Gilson & Lione

(57) ABSTRACT

A noise reduction structure of an electronic power steering apparatus including a worm shaft rotated by a motor, a worm wheel engaged in the worm shaft and rotating a steering shaft, and a housing surrounding the worm shaft includes a cylindrical damper unit formed as an elastic member in an inner side of the cylindrical damper unit for absorbing a shock transmitted to the worm shaft and rotatably connected to the worm shaft, a rubber holder coupled to a semi-cylindrical damper holder formed on a side surface of the damper unit for making a close contact between the worm shaft and the worm wheel, and a plug unit including a plug holder formed on a lower end of a side surface of the plug unit for coupling to the rubber holder and fixed to the housing on the other side of the plug unit.

7 Claims, 6 Drawing Sheets

-Prior Art- (A)            (B)

NOISE REDUCTION STRUCTURE OF ELECTRONIC POWER STEERING APPARATUS

CROSS-REFERENCE TO RELATED APPLICATIONS

This application claims priority to and the benefit of Korean Patent Application No. 10-2018-0120165, filed on Oct. 10, 2018, which is incorporated herein by reference in its entirety.

FIELD

The present disclosure relates to a noise reduction structure of an electronic power steering apparatus for a motor vehicle.

BACKGROUND

The statements in this section merely provide background information related to the present disclosure and may not constitute prior art.

Generally, motor driven power steering (MDPS) as an electronic power steering apparatus is used for assisting steering power by motor torque without using hydraulic pressure.

The MDPS includes a worm shaft that is rotated through a motor controlled by an electronic control unit (ECU) and a worm wheel coupled to the worm shaft, and operates as the worm wheel rotates a steering shaft to assist the steering power.

Gears of the worm shaft and the worm wheel engaged with each other inevitably wear, which increases an axial clearance of the worm shaft and causes rattle noise, which is metallic noise due to an increase in clearance.

Accordingly, the electronic power steering structure is used as an anti-rattle structure in order to remove the clearance between the worm shaft and the worm wheel for reducing the rattle noise. The anti-rattle structure presses the worm shaft toward the worm wheel by using a coil spring so that the worm shaft and the worm wheel may rotate by engaging with each other without the clearance.

In this regard, a structure for reducing noise of an electronic power steering elastically supports a worm gear shaft toward the worm wheel by using the coil spring to secure a stable engagement state of the worm gear shaft and the worm wheel, known from Korean Patent No. 10-1509798 (Noise Reduction Structure of Electronic Power Steering).

However, we have discovered that a single coil spring may not provide an appropriate level of elastic force and a spring or a damper is additionally used, and as a result, manufacturing cost increases. In addition, a backlash phenomenon is occurred as viscosity of grease between the worm shaft and the worm wheel increases at a low temperature, and clearance compensation is delayed. Accordingly, noise is occurred due to the engagement deterioration of the gears.

The above information disclosed in this Background section is only for enhancement of understanding of the background of the present disclosure, and therefore it may contain information that does not form the prior art that is already known to a person of ordinary skill in the art.

SUMMARY

The present disclosure provides a nose reduction structure of an electronic power steering apparatus which can adjust a clearance between a worm shaft and a worm wheel without an additional component by using a rubber holder and has stable anti-rattle performance even at a low temperature due to contraction of the rubber holder. In this way unwanted noise may be reduced or prevented.

An exemplary form of the present disclosure provides a noise reduction structure of an electronic power steering apparatus including a worm shaft rotated by a motor, a worm wheel engaged in the worm shaft and rotating a steering shaft, and a housing surrounding the worm shaft. The noise reduction structure includes a cylindrical damper unit formed as an elastic member in an inner side of the cylindrical damper unit rotatably connected to the worm shaft and configured to absorb a shock transmitted to the worm shaft, a rubber holder coupled to a semi-cylindrical damper holder formed on a side surface of the damper unit for making a close contact between the worm shaft and the worm wheel, and a plug unit including a plug holder formed on a lower end of a side surface of the plug unit for coupling to the rubber holder. In addition, the plug unit is fixed to the housing on the other side surface of the plug unit.

According to other form of the present disclosure, the damper holder includes a first groove, and the plug holder includes a second groove, respectively for coupling with the rubber holder, which may closely contact and surround the grooves.

According to other form of the present disclosure, the rubber holder includes an upper hole and a lower hole formed in a figure eight-letter shape so that a first inner surface of the upper hole may be in a close contact with a first outer circumference of the first groove formed in the damper holder and a second inner surface of the lower hole may be in a close contact with a second outer circumference of the second groove formed in the plug holder.

According to other form of the present disclosure, an upper end surface of the plug holder may support a lower end surface of the damper holder coupled with the rubber holder.

According to other form of the present disclosure, the rubber holder maintains a first shape thereof at a room temperature and contracts as a second shape with a decrease in ambient temperature, and the damper unit coupled with the contracted second shape of the rubber holder is pulled downward so that a clearance between the worm shaft and the worm wheel is decreased.

According to other form of the present disclosure, a thickness between the upper hole and the lower hole may be at least equal to or more than a clearance gap between the worm shaft and the worm wheel.

According to other form of the present disclosure, a material of the rubber holder may be formed by nitrile rubber or hydrogenated nitrile butadiene rubber.

According to an exemplary form of the present disclosure, it is advantageous in that a clearance between a worm shaft and a worm wheel can be adjusted at a low temperature as well as a room temperature to reduce a backlash phenomenon and noise.

According to the exemplary form of the present disclosure, an anti-rattle spring and multiple components for mounting the anti-rattle spring in the related art are replaced with a single rubber holder, thereby reducing manufacturing cost.

According to the exemplary form of the present disclosure, an assembly time of the component is shortened and the component is easily assembled.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
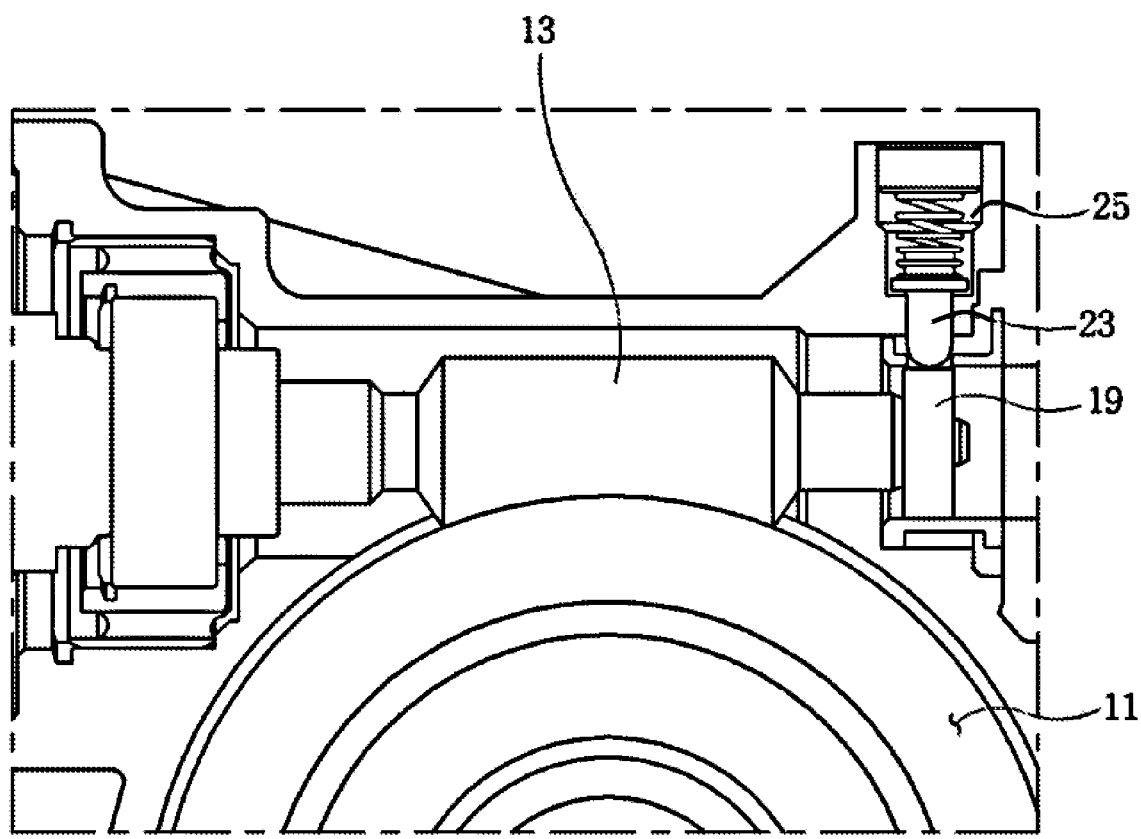
FIG. 1 is a front view illustrating a configuration of a noise reduction structure of an electronic power steering apparatus in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a front view illustrating a configuration of a noise reduction structure of an electronic power steering apparatus in the related art.

Referring to FIG. 1, an anti-rattle structure in the related art adopts a scheme that presses a worm gear 13 toward a worm wheel 11 by using a coil spring through a variable elastic member 25 so that the worm gear 13 and the worm wheel 11 may rotate while engaging with each other without a clearance.

In the noise reduction structure of the electronic power steering apparatus, as shown in FIG. 1, a pressing pin 23 and a support bearing 19 for mounting a coil spring are desired. Accordingly, the number of components is increased and their structure are complicated. When an ambient temperature becomes low, a viscosity of grease in the electronic power steering apparatus is increased and clearance compensation of the worm wheel 11 and the worm gear 13 is thus delayed.

Figure 2:
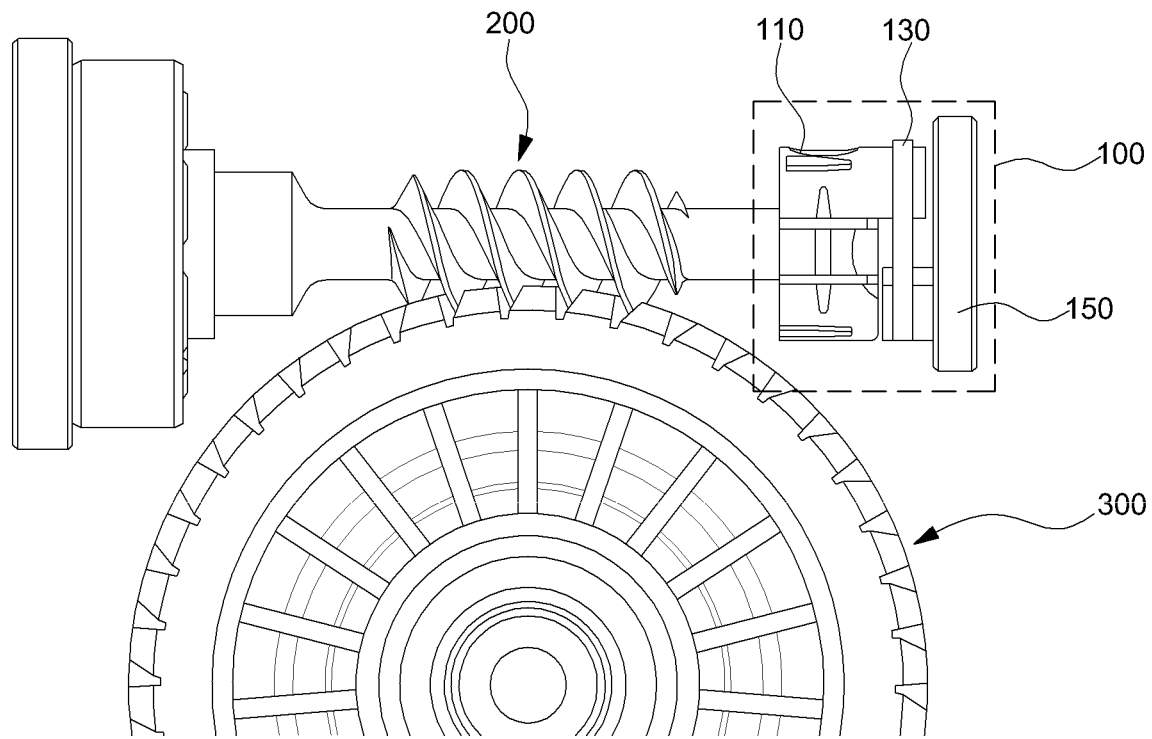
FIG. 2 is a front view illustrating a noise reduction structure of an electronic power steering apparatus according to an exemplary form of the present disclosure.

FIG. 2 is a front view illustrating a noise reduction structure 100 of an electronic power steering apparatus according to an exemplary form of the present disclosure.

Referring to FIG. 2, the noise reduction structure 100 of the electronic power steering apparatus may include a worm shaft 200 rotated by a motor (not shown), a worm wheel 300 engaged to the worm shaft 200 for rotating a steering shaft (not shown), and a housing (not shown) surrounding the worm shaft 200.

A damper unit 110, a plug unit 150, and a rubber holder 130 for connecting the damper unit 110 and the plug unit 150 are positioned in the housing.

The damper unit 110 is formed as a cylindrical shape. An inner side of the damper unit 110 is positioned on an outer bearing of the worm shaft 200 and rotatably connected to the worm shaft 200, and the damper unit 110 rotates clockwise or counterclockwise according to an operation of the motor. Furthermore, the inner side of the damper unit 110 is made of an elastic member to absorb axial and radial shocks transmitted to the worm shaft 200.

The plug unit 150 may be formed in a cylindrical shape similar to the damper unit 110. A side of the plug unit 150 may be faced to the damper unit 110 and may be coupled to the damper unit 110 with the rubber holder 130, and the other side thereof may be fixed to the housing.

The rubber holder 130 is coupled to an upper portion of a side surface of the damper unit 110 and is coupled to a lower portion of a side surface of the plug unit 150 to couple with the damper unit 110 and the plug unit 150.

The rubber holder 130 is made of a material having elasticity, such as rubber and the damper unit 110 and the plug unit 150 may be pulled toward the center of the rubber holder 130 with the elasticity. In this case, there is no change in movement of the plug unit 150 because the plug unit 150 is fixed to the housing and the damper unit 110 received a downward force moves down to decrease a clearance between the worm shaft 200 and the worm wheel 300. Accordingly, the worm shaft 200 and the worm wheel 300 are stably engaged.

Figure 3:
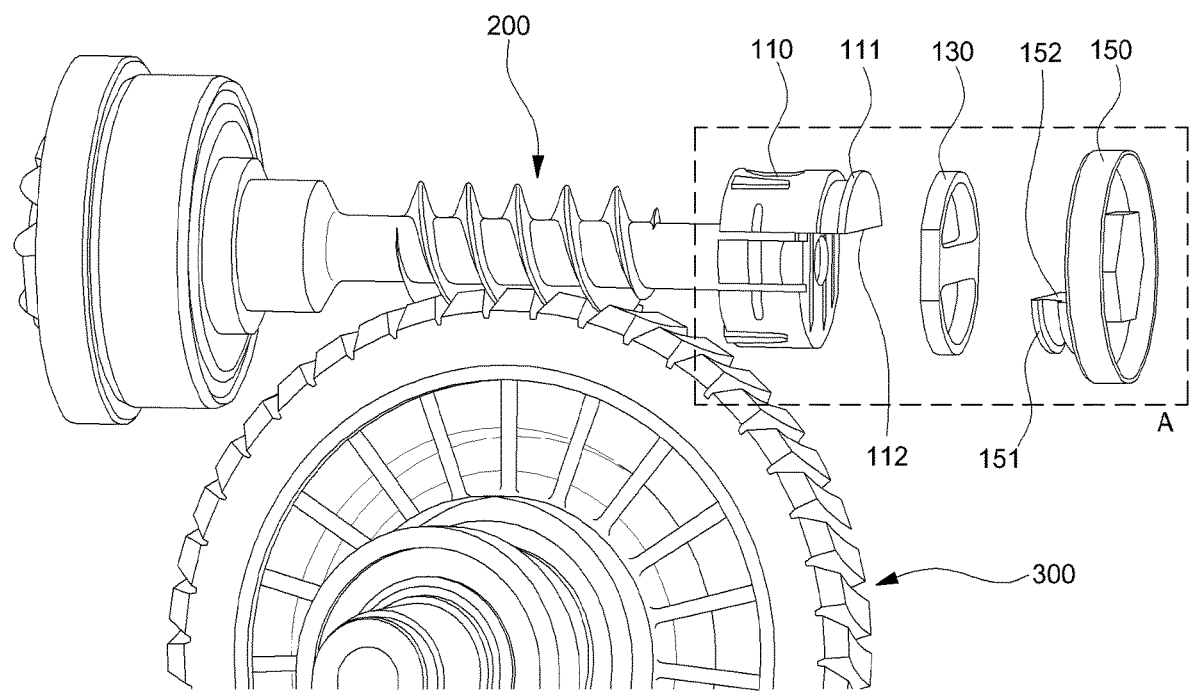
FIG. 3 is a perspective view illustrating a configuration of the noise reduction structure of the electronic power steering apparatus according to the exemplary form of the present disclosure.

FIG. 3 is a perspective view illustrating a configuration of a noise reduction structure 100 of an electronic power steering apparatus according to an exemplary form of the present disclosure.

Referring to FIG. 3, the damper unit 110 may have a semi-cylindrical damper holder 111 on an upper portion of one side thereof and the plug unit 150 may have a semi-cylindrical plug holder 151 on a lower portion of one side of the plug unit 150. While the damper holder 111 and the plug holder 151 are opposed to each other, the rubber holder 130 may be coupled to the damper holder 111 and the plug holder 151 at the same time.

When the damper holder 111 and the plug holder 151 are coupled with the rubber holder 130, an upper end surface 152 of the plug holder 151 may support a lower end surface 112 of the damper holder 111 coupled with the rubber holder 130.

Since the plug unit 150 is fixed to the housing and supports the rubber holder 130 and the damper holder 111, rigidity of the plug unit 150 is desired for fully supporting the rubber holder 130 coupled with the damper holder 111. Accordingly, a steel material may be used as a material of the plug unit 150. However, the present disclosure is not limited thereto, and aluminum or plastic having reinforced rigidity may also be used as the material of the plug unit 150.

Figure 4:
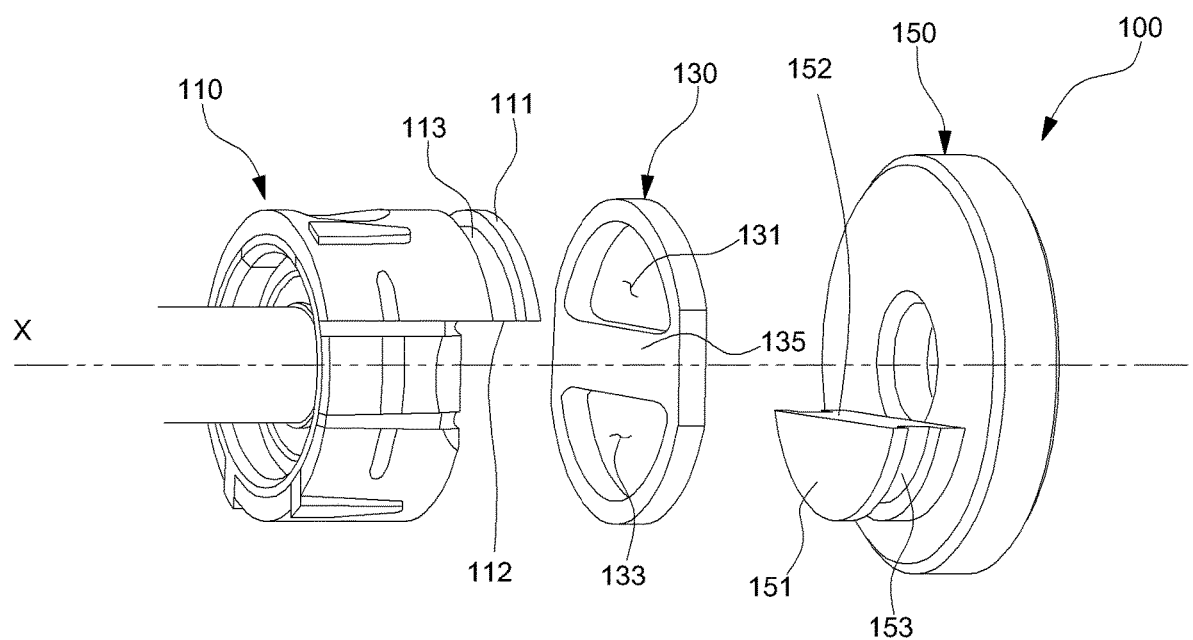
FIG. 4 is an enlarged diagram of part A of FIG. 3.

FIG. 4 is an enlarged diagram of part A of FIG. 3.

Referring to FIG. 4, the damper holder 111 and the plug holder 151 have a first groove 113 and a second groove 153, respectively for coupling with the rubber holder 130 and the rubber holder 130 may closely contact and surround the grooves 113 and 153. Since the grooves 113 and 153 and the rubber holder 130 have the same width along a longitudinal axis X, the rubber holder 130 is tightly filled in the grooves 113 and 153, and as a result, the rubber holder 130 may be stably coupled to the plug holder 151 and the damper holder 111.

Figure 5:
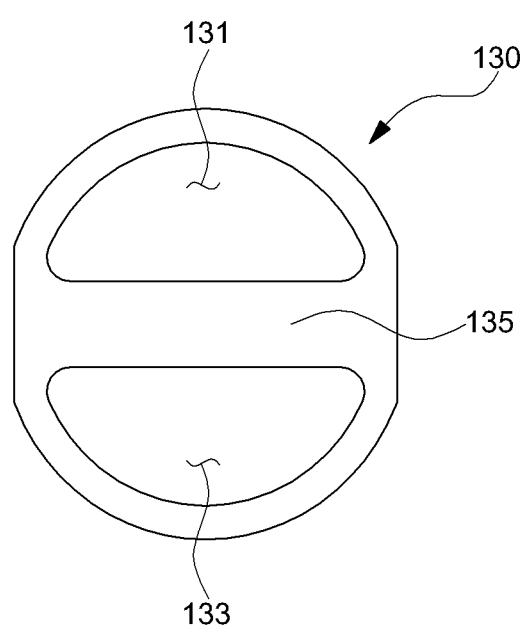
FIG. 5 is a front view of a rubber holder according to the present disclosure.

FIG. 5 is a front view of a rubber holder 130 according to the present disclosure.

Referring to FIG. 5, the rubber holder 130 is formed in a figure eight-letter shape so that a first inner surface of an upper hole 131 may be in a close contact with a first outer circumference of the first groove 113 formed in the damper holder 111 and a second inner surface of the lower hole 133 may be in a close contact with a second outer circumference of the second groove 153 formed in the plug holder 151.

As shown in FIGS. 4 and 5, when the damper holder 111 and the plug holder 151 are coupled with the rubber holder 130, an intermediate portion 135 between the upper hole 131 and the lower hole 133 in the rubber holder 130 may be formed to fill a space between the damper holder 111 and the plug holder 151 at the room temperature, and the intermediate portion 135 coupled with the upper end surface 152 of the plug holder 151 is configured to support the lower end surface 112 of the damper holder 111 coupled with the rubber holder 130.

Figure 6:
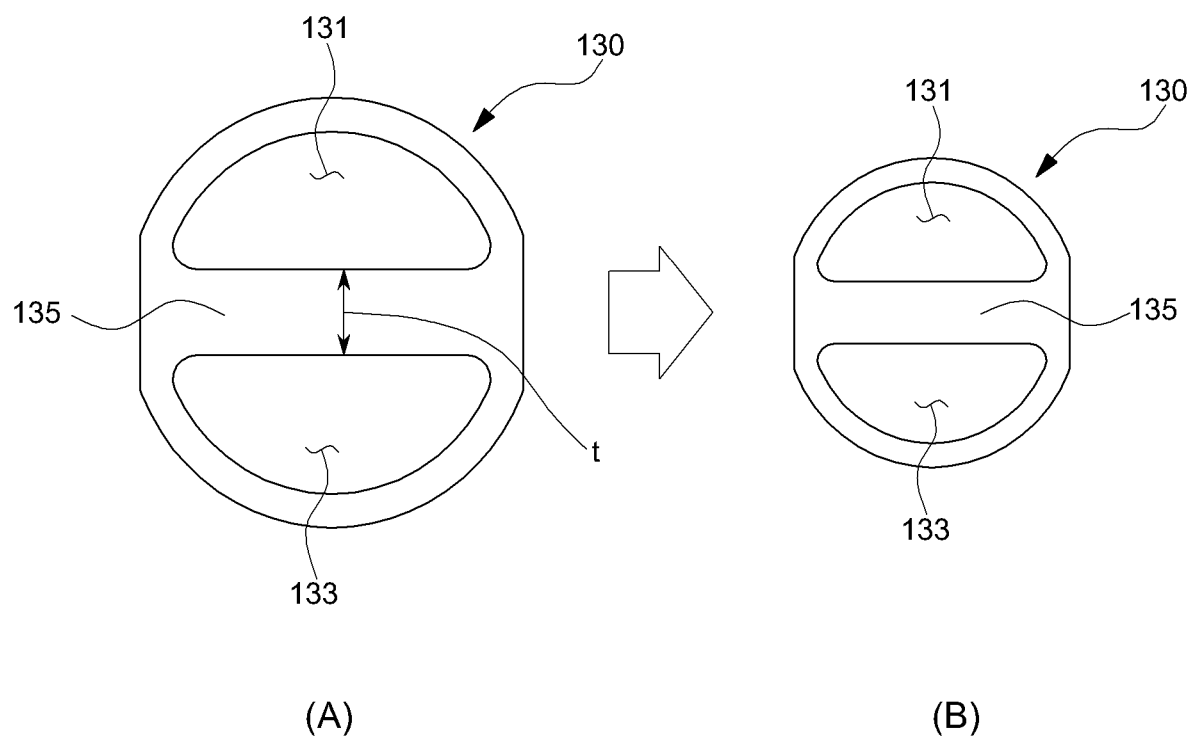
FIG. 6 is a front view illustrating both states of the rubber holder at a room temperature (A) and a lowered temperature in ambient temperature (B) according to the present disclosure.

FIG. 6 is a front view illustrating each state of the rubber holder 130 at a room temperature (A) and a lowered temperature in ambient temperature (B) according to the present disclosure.

Referring to FIGS. 4 and 6, the rubber holder 130 maintains its original shape as a first shape at the room temperature. At the room temperature, the rubber holder 130 applies a load to the damper unit 110 due to elastic force thereof. Accordingly, a stable engagement state between the worm shaft 200 and the worm wheel 300 is maintained by decreasing the clearance between the worm wheel 300 and the worm shaft 200.

In addition, the plug unit 150 fixed to the housing is inhibited from being excessively strongly engaged between the worm wheel 300 and the worm shaft 200, so that generation of rattle noise can be suppressed and a smooth and stable steering feeling may be provided.

In FIGS. 3 and 6, when the ambient temperature is lowered, the rubber holder 130 contracts. Accordingly, the clearance gap between the worm shaft 200 and the worm wheel 300 may be narrowed because the damper unit 110 moves downward due to the contraction of the rubber holder 130. Therefore, even though the viscosity of the grease increases at the low temperature, tilting of the worm shaft 200 is not delayed, thereby a backlash phenomenon and a noise generation phenomenon is reduced or prevented.

Since the intermediate portion 135 is contracted at the low temperature (see (B) in FIG. 6) and the worm shaft 200 is moved downward, a thickness t of the intermediate portion 135 in the original shape of the rubber holder 130 (see (A) in FIG. 6) may be at least equal to or more than the clearance gap between the worm shaft 200 and the worm wheel 300.

Since the rubber holder 130 needs to smoothly contract at the low temperature, the material of the rubber holder 130 may be nitrile rubber or hydrogenated nitrile butadiene rubber, which may be normally contracted at the low temperature, but the material of the rubber holder 130 is not limited thereto.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A noise reduction structure of an electronic power steering apparatus including a worm shaft rotated by a motor, a worm wheel engaged in the worm shaft and rotating a steering shaft, and a housing surrounding the worm shaft, the noise reduction structure comprising:
    a cylindrical damper unit formed as an elastic member in an inner side of the cylindrical damper unit rotatably connected to the worm shaft and configured to absorb a shock transmitted to the worm shaft;
    a rubber holder coupled to a semi-cylindrical damper holder formed on a side surface of the damper unit for making a close contact between the worm shaft and the worm wheel; and
    a plug unit including a plug holder formed on a lower end of a side surface of the plug unit for coupling to the rubber holder, the plug unit fixed to the housing on an other side surface of the plug unit.

2. The noise reduction structure of claim 1, wherein the damper holder includes a first groove and the plug holder includes a second groove, respectively for coupling with the rubber holder, which closely contacts and surrounds the grooves.

3. The noise reduction structure of claim 2, wherein the rubber holder includes an upper hole and a lower hole formed in a figure eight-letter shape so that a first inner surface of the upper hole is in close contact with a first outer circumference of the first groove formed in the damper holder and a second inner surface of the lower hole is in close contact with a second outer circumference of the second groove formed in the plug holder.

4. The noise reduction structure of claim 3, wherein a thickness between the upper hole and the lower hole is at least equal to or more than a clearance gap between the worm shaft and the worm wheel.

5. The noise reduction structure of claim 1, wherein an upper end surface of the plug holder supports a lower end surface of the damper holder coupled with the rubber holder.

6. The noise reduction structure of claim 1, wherein the rubber holder maintains a first shape thereof at a room temperature and contracts as a second shape with a decrease in ambient temperature, and the damper unit coupled with the contracted second shape of the rubber holder is pulled downward so that a clearance between the worm shaft and the worm wheel is decreased.

7. The noise reduction structure of claim 1, wherein the rubber holder is formed by nitrile rubber material or hydrogenated nitrile butadiene rubber material.

* * * * *